United States Patent
Delecroix et al.

(10) Patent No.: US 12,470,512 B1
(45) Date of Patent: Nov. 11, 2025

(54) CONTROLLER-BASED TRAFFIC FILTERING AND ADDRESS MODIFICATION

(71) Applicant: AVIATRIX SYSTEMS, INC., Santa Clara, CA (US)

(72) Inventors: Nicolas Delecroix, Santa Clara, CA (US); Saad Mirza, Murphy, TX (US)

(73) Assignee: Aviatrix Systems, Inc., Santa Clara, CA (US)

(*) Notice: Subject to any disclaimer, the term of this patent is extended or adjusted under 35 U.S.C. 154(b) by 269 days.

(21) Appl. No.: 17/539,550

(22) Filed: Dec. 1, 2021

(51) Int. Cl.
*H04L 61/2521* (2022.01)
*H04L 45/00* (2022.01)
*H04L 45/586* (2022.01)
*H04L 61/5007* (2022.01)

(52) U.S. Cl.
CPC ........ *H04L 61/2521* (2013.01); *H04L 45/586* (2013.01); *H04L 45/72* (2013.01); *H04L 61/5007* (2022.05)

(58) Field of Classification Search
CPC . H04L 61/2521; H04L 61/5007; H04L 45/02; H04L 45/586; H04L 45/72
USPC ......................................................... 709/245
See application file for complete search history.

(56) References Cited

U.S. PATENT DOCUMENTS

| | | | |
|---|---|---|---|
| 2005/0185646 A1* | 8/2005 | Karino ................ | H04L 67/1001 370/389 |
| 2009/0003198 A1* | 1/2009 | Hashiguchi ............. | H04J 3/085 370/254 |
| 2020/0092138 A1* | 3/2020 | Tillotson ............. | H04L 12/4633 |

* cited by examiner

*Primary Examiner* — Hermon Asres
(74) *Attorney, Agent, or Firm* — .Jackson Walker LLP

(57) ABSTRACT

In communication with components of a cloud platform, namely a software-defined network constructed to overlay at least one public cloud network, a controller features a virtual processor and a data store. The data store includes network address translation (NAT) processing logic configured to determine whether a control plane message from tenant resources is associated with a network address overlapping condition, which represents a first network address included in the control plane message overlaps a network address range relied upon by either (a) at least one of the components of the cloud platform or (b) a component associated with other tenant resources. The NAT processing logic is further configured to alter routing data stores that maintain routing information for each of the components of the cloud platform to substitute the first network address with a first virtual network address for subsequent data message routing.

18 Claims, 10 Drawing Sheets

CONTROLLER-BASED TRAFFIC FILTERING AND ADDRESS MODIFICATION

FIELD

Embodiments of the disclosure relate to the field of networking. More specifically, one embodiment of the disclosure relates to an automated message filtering and modification system implemented within a centralized controller that operates with one or more edge (spoke) gateways to handle network traffic with overlapping network addresses.

GENERAL BACKGROUND

Over the past few years, cloud computing has provided Infrastructure as a Service (IaaS), where resources have been developed to leverage and control the native constructs for all types of public cloud networks, such as AMAZON® WEB SERVICES (AWS), MICROSOFT® AZURE® Cloud Services, GOOGLE® Cloud Services, or the like. These resources operate as a network infrastructure, which overlays portions of a public cloud network or multiple public cloud networks and provides enhanced functionality (e.g., enhanced security, scalability, visibility, etc.) and is provided access by tenants as a service. Herein, this overlaying network infrastructure is generally referred to as a "cloud platform." The cloud platform may be configured to support hundreds of tenants concurrently by implementing virtual networking infrastructures, where the construct of these networking infrastructures may vary depending on the public cloud provider. For example, the virtual networking infrastructures may include virtual private clouds for AMAZON® WEB SERVICES (AWS), virtual networks for MICROSOFT® AZURE® Cloud Services, or the like. For ease and consistency, herein, we shall refer to all types of these virtual networking infrastructures as a "virtual private cloud network" or "VPC."

In general, a virtual private cloud network (VPC) is an on-demand, configurable pool of shared resources, which may be allocated within the cloud platform and provide a certain level of isolation between the different organizations or other entities (hereinafter, "users") using the cloud resources. Overlaying the infrastructure of a public cloud network, certain types of VPCs, referred to as "spoke" VPCs, used as an entry point in the routing of messages, received from computing devices within an on-premises network, across a control plane and/or data plane that collectively form the overlaying network infrastructure. The "control plane" refers to all functions and/or processes that determine which routing path to use when sending a message. The "data plane" refers to all functions and/or processes that forward messages from one interface to another based on controls set by logic associated with the control plane. These VPCs may be configured to support the routing of messages with the same region of a public cloud network, different regions of the same public cloud network, or different public cloud networks.

Conventionally, each of the spoke VPCs may include logic that is manually programmed to perform a network address translation on an incoming control plane message. However, given the frequent modification of VPCs and the large number of VPCs that each tenant may deploy to interact with shared services provided by the public cloud network provider, the management of these VPCs can be highly complex. Current VPC management tools fail to provide adequate safeguards for identifying and modifying messages with overlapping network addresses, which is becoming increasingly problematic given the dynamic scaling and modifications experienced with VPC deployments. Firstly, desired connectivity may not be achieved as the proper routing of data traffic cannot be guaranteed. Secondly, manual configurations of NAT and the associated control plane policies bring a security risk to cloud platforms. For example, where overlapping network addresses for on-prem computing devices are permitted to propagate through a cloud network, a significant security risk is present as data returned from shared services requested by a first tenant may be directed to a second tenant, when the first and second tenants having overlapping network addresses caused by tenant subnetworks having identical prefixes such as the same network identifiers.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
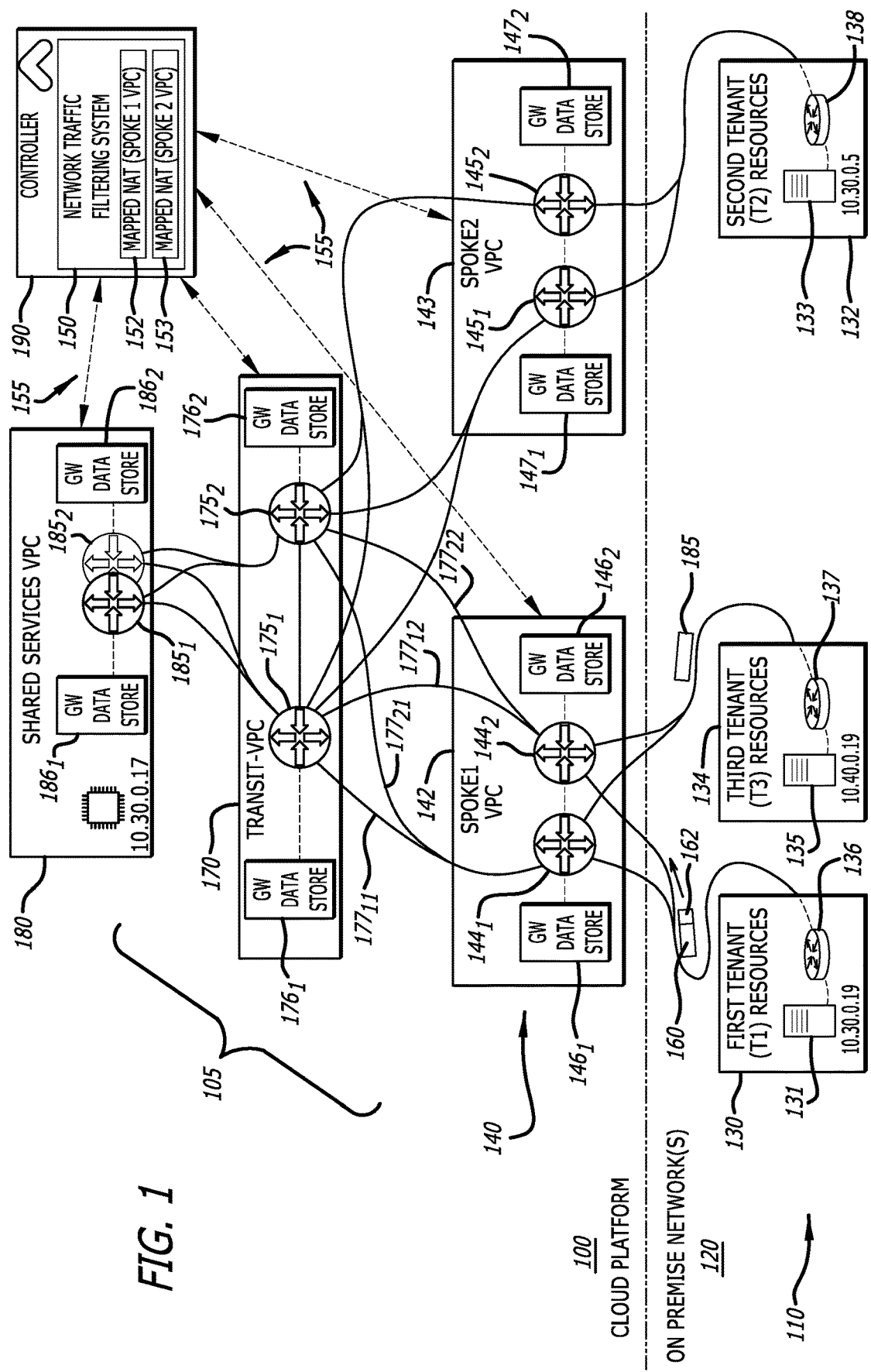
FIG. 1 is an exemplary embodiment of a cloud platform configured as a software-defined cloud overlay network and deploying a network traffic filtering system.

Embodiments of a network traffic filtering system, operating with one or more cloud components of a software-defined network constructed to overlay a public cloud network, is configured to provide enhanced controls and management of communications over the public cloud network (hereinafter, "cloud platform"). As described below, the network traffic filtering system is configured to monitor for overlapping network addresses pertaining to (i) cloud components within the cloud platform and resources associated with a tenant using the cloud platform and/or (ii) resources associated with different tenants using the cloud platform. An example of "tenant resources" may include, but is not limited or restrict to one or more components deployed within a tenant environment. The "tenant environment" may correspond to an on-premises network of the tenant and is communicatively coupled to the cloud platform such as one or more computing devices. As an alternative, the "tenant resources" may include one or more cloud components operating within the tenant environment corresponding to a virtual networking infrastructure (VPC) of the tenant (hereinafter, "tenant VPC") and communicatively coupled to other components within the cloud platform.

While the cloud service providers responsible for managing the cloud platform may have control in the addressing for their own subnetworks (hereinafter, "subnets"), these cloud service providers have no control over the subnet addressing selected by tenants that utilize the services provided by the cloud platform. Hence, at times, especially when tenant resources transmit a Border Gateway Protocol (BGP) advertisement to establish a routing with cloud services, the advertised subnet address associated with the tenant resource may overlap (i) a network address range assigned to a cloud component within the cloud platform and/or (ii) a network address range utilized by another tenant.

As known, network addresses, such as Internet Protocol (IP) addresses for example, may be divided into sections. A first section of the IP address may identify the network (hereinafter, "network ID") while a second segment may identify a specific machine or host within the network (hereinafter, "host ID"). Subnet masks and prefixes (IPv4) can be used to establish the range of useable IP addresses supported by a subnet (i.e., group of IP addresses associated with the same network ID). For example, a subnet address (e.g., Classless-InterDomain Routing "CIDR" representation of a subnet IP address range) can be used to identify all computing devices associated with a particular company or a collection of users segmented by any number of parameters such as geographic location, user characteristics (e.g., job title, department, etc.), or the like. In many situations, a tenant may utilize tens or hundreds of subnets with the cloud platform supporting thousands of tenants.

Dividing a tenant's network into subnets allows the tenant to be connected to the cloud platform with a single shared network address. Subnet masks and prefixes are relied upon when a tenant is attempting to communicate with another system. If the system is on a different network, a message may be sent to a gateway, and thereafter, routed to a targeted IP address. This routing is referred to as Classless-InterDomain Routing (CIDR). For example, in IPv4 address format, the subnet mask 255.255.255.0 is 32-bits, namely four 8-bit octets. This representation identifies a 24-bit subnet prefix and the subnet supporting more than 250 useable IP addresses ranging from xx.xx.xx.1-xx.xx.xx.254. For clarity, as described herein, 1Pv4 addresses are used in determining network address overlapping conditions, albeit the invention may be utilized by other protocols directed to addressing and routing network traffic.

Herein, during tenant registration to the cloud platform, a cloud instance deployed within the controller (or a cloud platform administrator) is provided access to the actual subnetwork addresses (referred to as "real subnet addresses") associated with the tenant resources, namely the components deployed within the tenant environment such as a tenant VPC or on-prem network for example, for initially determining whether any of these real subnet addresses overlap a known subnet address range already assigned to cloud components installed within the cloud platform or another tenant. During the registration phase, the cloud instance or cloud platform administrator conducts an initial determination whether the communicative coupling of the tenant resources to the cloud platform would create a network address overlapping condition, and if so, a mapped network address translation (NAT) is configured to handle this network address overlapping condition.

According to one embodiment of the disclosure, the mapped NAT corresponds to a collection of network address translations for a routing protocol established between the cloud platform and a tenant environment over a network connection (e.g., BGP tenant connection) to avoid network address overlapping conditions. The collection of network address translations includes translations between "real" subnet addresses (sometimes referred to as "real VPC CIDR") and "virtual" subnet addresses (sometimes referred to as "virtual VPC CIDR"). A "virtual" subnet address constitutes a non-overlapping, substitute address for a particular real subnet address. The mapped NAT may be stored within a data store being a portion of non-transitory storage medium.

In response to detecting further network address overlapping conditions, additional network address translations are generated for storage within the mapped NAT. According to one embodiment, the additional network address translations may be manually programmed or generated through IP Address Management (TPAM) integration to fetch the next available virtual subnet address.

Thereafter, for ingress network traffic received by an edge cloud component (e.g., spoke gateway) from a tenant resource outside of the cloud platform (e.g., on-premises computing device), logic implemented within one or more selected cloud components of the cloud platform (e.g., NAT processing logic within the controller) is configured to detect a network address overlapping condition for ingress traffic. According to one embodiment of the disclosure, the network address overlapping condition may be detected when a real subnet address included within an incoming control plane message (e.g., subnet prefix within the BGP advertisement) is found in the mapped NAT. If so, the NAT processing logic assists in components of the cloud platform that are responsible the routing of messages over one or more public cloud networks to/from the tenant resource (e.g., on-premises computing device).

As an illustrative example, this translation may involve configuring routing tables for each of the cloud components with the cloud platform, which may overlay the infrastructure of a single public cloud network or multiple (two or more) public cloud networks, to include the real subnet address or the virtual subnet address to effectuate routing with the on-premises computing device. The controller is configured to signal the cloud components, such as various gateways implemented within the cloud platform, via direct messages to update their routing tables to include the virtual VPC CIDR in lieu of the real VPC CIDR to avoid an overlapping address condition to promote greater security and reliable operability.

Similarly, in response to communicatively coupling (i.e., attaching) a VPC to the cloud platform (e.g., attaching the VPC to a transit VPC of the cloud platform), the NAT processing logic may be further configured to determine, using the "real" subnet address for the attached VPC, whether a network address overlapping condition would exist for resources communicatively coupled to the cloud platform over BGP tenant connections. According to one embodiment of the disclosure, the network address overlapping condition may be detected when the real subnet address, such as the real VPC CIDR being a CIDR-representation of a subnet IP address range associated with the attached (cloud-based) VPC and included in a VPC attachment message for example, is found in a mapped NAT associated with a BGP tenant connection.

If so, the NAT processing logic assists in performing the translation by at least signaling each spoke gateway operating as a terminating end of a BGP tenant connection with a detected network address overlapping condition to modify its routing table to include a virtual VPC CIDR (virtual subnet address) in lieu of its corresponding real VPC CIDR (real subnet address). For the BGP tenant connection(s) without any network address overlapping conditions (i.e., no mapped NAT or the real subnet address under review is not present in the mapped NAT), the NAT processing logic signals each spoke gateway operating as a terminating end of those BGP tenant connections to simply maintain the real VPC CIDR for routing to/from those spoke gateways not subject to network address overlapping conditions.

Stated differently, NAT processing logic of the network traffic filtering system is assigned to perform an address translation for control plane messages received by the cloud platform and control plane messages output from the cloud platform. In particular, for ingress traffic, the NAT processing logic may access a listing of network address translations (mapped NAT) for real subnet addresses reserved for components forming the cloud platform (e.g., real subnet address to virtual subnet address translations). The address translation is conducted before a data message (sourced by a component associated with a real subnet address included in the mapped NAT) is propagated through the cloud platform. Given its global awareness of potential network address overlapping conditions, the controller populates mapped NATs for each spoke VPC of the cloud platform and referenced by one or more spoke gateways deployed within the spoke VPC.

As a result, the spoke VPC is configured to allow content associated with an incoming control plane message to propagate through the cloud platform if (i) the real subnet (IP) address identified in the control plane message does not overlap any real subnet (IP) address range associated with a cloud component of the cloud platform, and (ii) the real subnet (IP) address overlaps an IP address range associated with a cloud component, but the real subnet (IP) address is modified with a virtual IP address that does not overlap any IP address ranges utilized by the cloud components. Hence, the spoke gateway may be configured to prevent subsequent data messages from being errantly propagated over the cloud platform if there is an entry within the mapped NAT that denotes the incoming control plane message features a network address overlapping condition (e.g., subnet address associated of an incoming control plane message falls within a subnet address utilized by one of the components of the cloud platform). Yet another alternative, the spoke gateway may be configured to conduct a translation of an address of the incoming control plane message to avoid any network address overlapping conditions, such as a real subnet address of the incoming control plane message (e.g., real VPC CIDR) is noted as an entry in the mapped NAT, and thus, is substituted with a corresponding virtual subnet address (e.g., virtual VPC CIDR) with that entry before propagation through the cloud platform.

Additionally, in response to receipt of a VPC attachment message including a real subnet address (e.g., real VPC CIDR) of the newly attached VPC, the NAT processing logic may access mapped NATs for all the BGP tenant connections for real subnet (IP) addresses that are correlated to (e.g., identical or falling within the subnet address range of) the real VPC CIDR. This correlation denotes a potential network address overlapping condition. If correlated, the NAT processing logic may be configured to conduct a translation of real VPC CIDR to a virtual network address of the attached VPC (e.g., virtual VPC CIDR) by providing the corresponding virtual VPC CIDR to the spoke gateway or spoke gateways associated with the BGP tenant connection(s) to transit a BGP advertisement with the virtual VPC CIDR to avoid security issues and errand data caused by a network address overlapping condition.

I. Terminology

In the following description, certain terminology is used to describe features of the invention. In certain situations, each of the terms "logic" and "component" is representative of hardware, software, or a combination thereof, which is configured to perform one or more functions. As hardware, the logic (or component) may include circuitry having data processing and/or storage functionality. Examples of such circuitry may include, but are not limited or restricted to a processor (e.g., microprocessor, one or more processor cores, a programmable gate array, a microcontroller, an application specific integrated circuit, etc.); non-transitory storage medium; combinatorial logic that collectively perform a specific function or functions, or the like.

Alternatively, or in combination with the hardware circuitry described above, the logic (or component) may be software in the form of one or more software modules. The software module(s) may be configured to operate as one or more software instances with selected functionality (e.g., virtual processor, data analytics, etc.) or as a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device.

Controller: A "controller" is a component that manages operability of a single region or multiple regions of a single-cloud platform or multi-cloud platform by leveraging centralized intelligence acquired based on access and knowledge of content associated with network traffic through each gateway. The controller includes logic, referred to as NAT processing logic, that enforces policies directed to filtering and/or routing modification, which may be unique to each gateway and/or each VPC. The filter and/or modification rules may correspond to conducting checks and updating of a mapped NAT, namely a data store directed to reassignment of a network address to avoid collisions that may significantly affect operations of the cloud platform.

Tenant: Each "tenant" uniquely corresponds to a particular customer provided access to the cloud platform, such as a company, individual, partnership, or any group of entities (e.g., individual(s) and/or business(es)).

Computing device: A "computing device" may be construed as virtual or physical logic with data processing and/or data storage functionality. Herein, a computing device may include a virtual device that is configured to perform functions based on information received from cloud components. For example, the computing device may correspond to a virtual server configured to execute software instances retrieved from cloud shared services.

Gateway: A "gateway" may be construed as virtual or physical logic with data monitoring or data routing functionality. As an illustrative example, a first type of gateway may correspond to virtual logic, such as a data routing software component that is assigned an Internet Protocol (IP) address within an IP address range associated with a virtual networking infrastructure (VPC) including the gateway, to handle the routing of messages within and from the VPC. Herein, the first type of gateway may be identified differently based on its location/operability within a public cloud network, albeit the logical architecture is similar.

For example, a "spoke" gateway is a gateway that supports routing of network traffic between a component requesting a cloud-based service and a shared services VPC that maintains the cloud-based service offered by the cloud platform and made available to multiple (two or more) tenants. A "transit" gateway is a gateway configured to further assist in the propagation of network traffic (e.g., one or more messages) between different VPCs such as different spoke gateways within different spoke VPCs. Alternatively, in some embodiments, the gateway may correspond to physical logic, such as a type of computing device that supports and is addressable (e.g., assigned a network address such as an TP address).

IPSec tunnels: Secure peer-to-peer communication links established between gateways of neighboring virtual network components such as neighboring VPCs. The peer-to-peer communication links are secured through a secure network protocol suite referred to as "Internet Protocol Security" (IPSec).

Overlapping network address: This term identifies a network address that may fall within subnet IP address ranges associated with different subnets. Herein, a network address overlapping condition may be determined when a subnet address, represented by a Class Inter-Domain Routing (CIDR) representation designating a subnet that is advertising a service or network presence, is identical to or is a subset of a subnet address range utilized by (i) a cloud component (e.g., VPC, etc.) of the cloud platform and/or (ii) resources (on-premises or cloud-based) associated with another tenant.

Computerized: This term generally represents that any corresponding operations are conducted by hardware in combination with software.

Message: Information in a prescribed format and transmitted in accordance with a suitable delivery protocol. Hence, each message may be in the form of one or more packets (e.g., data plane packets, control plane packets, etc.), frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Cloud Platform Architecture and General Operability

Referring now to FIG. 1, an exemplary embodiment of a cloud platform 100 deploying one or more network traffic filtering systems is shown. The cloud platform 100 may correspond to a software-defined cloud or multi-cloud overlay network featuring components in communication through messages using private network addresses such as Internet Protocol (IP) addresses. The cloud platform 100 is configured to provide resources 110 located within one or more on-premises networks 120 with connectivity to enhanced cloud services. These resources 110 may involve multi-tenant resources, such as first tenant resources 130, second tenant resources 132, and/or third tenant resources as shown. These multi-tenant resources 110 may feature computing devices, routers for connectivity to certain cloud components, or the like.

Herein, according to one embodiment of the disclosure, the first tenant resources 130, the second tenant resources 132 and the third tenant resources 134 may constitute resources deployed within the on-premises network(s) 120, namely the same on-premises network or different on-premises networks. For example, the first tenant (T1) resources 130 and the third tenant (T3) resources 134 may feature computing devices 131 and 135, respectively. For this example, the T1 resources 130 and T3 resources 134 may be attributable to different departments within the same company (Company A). In contrast, the T1 resources 130 and the T2 resources 132 may feature computing devices 131 and 133 respectively, which are attributable to different companies (Company A & Company B). Similarly, according to another embodiment of the disclosure, the tenant resources 130/132/134 may constitute virtual private cloud networks (VPCs) that are associated with different tenants and deployed within the same or different regions of a public cloud network or different public cloud networks.

According to this embodiment of the disclosure, the cloud platform 100 includes one or more virtual private cloud networks (hereinafter, "spoke VPCs") 140, which are configured for communications with the tenant resources 130/132/134. Herein, each of the spoke VPCs (e.g., a first spoke (Spoke1) VPC 142) is communicatively coupled to a network traffic filtering system 150 operating within a network controller 190, where the network traffic filtering system 150 is configured to detect network address overlapping conditions.

For instance, a first type of network address overlapping condition occurs when a network address (e.g., real subnet IP address) within a control plane message 160 received from tenant resources supported by that spoke VPC (e.g., T1 resources 130 and/or T3 resources 134) overlaps a specific network address or specific network (IP) address range utilized by any of the cloud components 105 of the cloud platform 100 or a specific network address range utilized by another tenant resource.

For example, where the control plane message 160 corresponds to a Border Gateway Protocol (BGP) advertisement for example, after receipt of the BGP advertisement 160 from T1 resources 130 by a gateway $144_1$ or $144_2$ of the Spoke1 VPC 142, the network traffic filtering system 150 may be configured to access the Class Inter-Domain Routing (CIDR) representation of a real subnet IP address 162 of the T1 resources 130 (referred to as "real VPC CIDR 162") from the BGP advertisement 160 to determine whether the real VPC CIDR 162 overlaps a CIDR-representation of a subnet IP address assigned to a cloud component 105 implemented as part of the cloud platform 100 and/or a CIDR-representation of a subnet IP address assigned to other tenant resources (e.g., T2 resources 132). This determination may include a review of content within a first mapped NAT 152, which provides CIDR-representations of "real" subnet IP addresses for the cloud components 105 and known tenant resources accessible via the Spoke1 VPC 142 having overlapping network addresses. The cloud components 105 may include one or more gateways and/or one or more cloud shared services.

The spoke VPCs 140 are coupled to other VPCs 170 within the cloud platform 100. Each of these other VPCs (hereinafter, "transit VPCs" 170) is responsible for propagating data plane messages received by the spoke VPCs 140 to other VPCs such as the cloud shared service VPC 180. As shown in FIG. 1, the Spoke1 VPC 142 is configured to communicate with one or more tenant resources (e.g., T1 resources 130 via router 136 and/or T3 resources 134 via router 137), where the T1/T3 resources 130/134 may be deployed within the same on-premises network, different on-premises networks, or alternatively, the T1/T3 resources 130/134 may be deployed as a cloud component. A second spoke VPC 143 (hereinafter, "Spoke2 VPC") is configured to communicate with the T2 resources 132 via a router 138, where the T2 resources 132 may be deployed within the same on-premises network as T1 resources 130 and/or T3 resources 134 or within a different on-premises network.

More specifically, according to one embodiment of the disclosure, the T1 resources 130 and the T3 resources 134 are configured to exchange data traffic with a selected gateway of a set (e.g., one or more) of gateways $144_1$-$144_M$ (M≥1) maintained in the Spoke1 VPC 142. Herein, these gateways $144_1$-$144_M$ are referred to as "spoke gateways" $144_1$-$144_M$. Each of the spoke gateways $144_1$-$144_M$ is communicatively coupled with the controller 190, including the network traffic filtering system 150, over a control plane 155. The control plane 155 is the messaging infrastructure between the controller 190 and the cloud components 105 forming the cloud platform 100.

According to one embodiment of the disclosure, the network traffic filtering system 150 is configured to detect a first type of network address overlapping condition by at least conducting analytics on one or more control plane messages input into the cloud platform 100 (e.g., incoming control plane message 160). These analytics may include conducting a review of the content of the first mapped NAT 152 to determine whether a "real" subnet (IP) address of tenant resources hosting the incoming control plane message 160 (e.g., T1 resource 130) overlaps (i) a real subnet (IP) address utilized by any of the cloud components 105 within the cloud platform 100 (included in the first mapped NAT 152) and/or (ii) a real" subnet (IP) address utilized by tenant resources other than the hosted tenant resources (e.g., T2/T3 resource 132/134).

Figure 4:
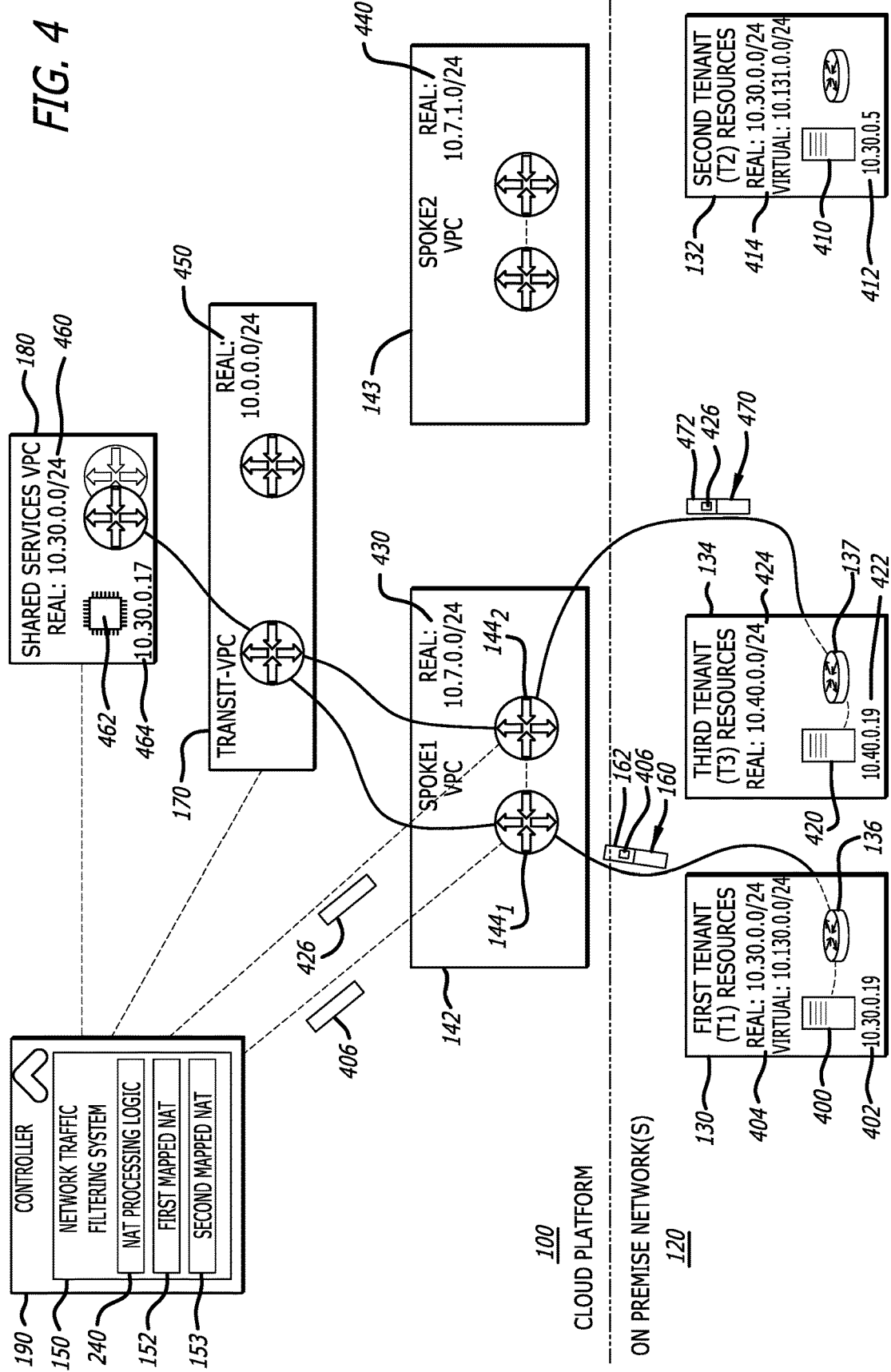
FIG. 4 is a first exemplary embodiment of the operability of network traffic filtering system deployed within cloud components of the cloud platform to restrict continued propagation of network traffic associated with an overlapping network address.

Responsive to detecting the first type of network address overlapping condition, the network traffic filtering system 150 is configured to (i) perform a network address translation upon detecting a network address overlapping condition (see FIG. 5A) and/or (ii) block propagation of the control plane message 160 in response to detecting the network address overlapping condition (see FIG. 4). While deployed within the controller 190, the network traffic filtering system 150 may be integrated, wholly or partially, into each spoke gateway $144_1$ . . . and $144_M$ or may be implemented as a separate cloud component interacting with the spoke gateways $144_1$-$144_M$.

Similarly, the T2 resources 132 are configured to exchange data traffic with a selected spoke gateway of a set of spoke gateways $145_1$-$145_M$ maintained in the Spoke2 VPC 143. Each of the spoke gateways $145_1$-$145_M$ may be associated with a network traffic filtering system 150, which is also configured to conduct analytics to detect network address overlapping conditions. The analytics may include a review of content within a second mapped NAT 153, which identifies network address overlapping conditions pertaining to subnet IP addresses for the cloud components 105 and known tenant resources in conflict with the subnet IP address range for the T2 resources 132.

In response to detection of a network address overlapping condition, the network traffic filtering system 150 is configured to (i) perform a network address translation (see FIG. 5A) and/or (ii) block propagation of content associated with the incoming control plane message (see FIG. 4). While deployed within the controller 190, as an alternative, the network traffic filtering system 150 may be integrated, wholly or partially, into each spoke gateway $145_1$ . . . and $145_M$ or may be implemented as a separate cloud component interacting with the spoke gateways $145_1$-$145_M$.

Also, the network traffic filtering system 150 may be configured to detect a second type of network address overlapping condition by at least conducting analytics on contents of a VPC attachment message generated based on a cloud service (e.g., shared services VPC 180), recently communicatively coupled to the cloud platform 100. The analytics may include accessing contents of each mapped NAT 152/153 to determine whether the real subnet address is included as an entry within the first mapped NAT 152. If so, the network traffic filtering system 150 is configured to perform a network address translation (see FIG. 5D) and/or block propagation.

The controller 190 for the cloud platform 100, operating as a full-mesh network, is configured to manage gateway data stores $146_1$-$146_M$, $176_1$-$176_M$, $186_1$-$186_M$ that control the propagation paths involving spoke gateways $144_1$-$144_M$, transit gateways $175_1$-$175_M$, and gateways 1851-185M associated with shared services 180, respectively. Additionally, the controller 190 is configured to manage the first mapped NAT 152 associated with a first BGP tenant connection and utilized by these spoke gateways $144_1$-$144_M$. Each gateway data store $146_1$ . . . or $146_M$ is configured to identify which spoke gateway $144_1$ . . . or $144_M$ is responsible for interacting with which tenant resources 130/134 (e.g., to receive message(s), forward message(s), etc.), where each gateway data store $146_1$ . . . or $146_M$ may be generated and uniquely assigned for each spoke gateways $144_1$-$144_M$, respectively. The first mapped NAT 152 may be generated and shared among a plurality of spoke gateways $144_1$-$144_M$ within the same spoke VPC 142. A similar relationship exists between the spoke gateways $145_1$-$145_M$, gateway data stores 1471-147M, and the second mapped NAT 153 that is associated with the BGP connection between the tenant resources 132 and the spoke gateways $145_1$-$145_M$, which could reside in the same geographic region or different geographic region as spoke gateways $144_1$-$144_M$, or could reside in a different public cloud network.

Each of the mapped NATs 152/153 may be configured with address translations that identify subnet IP addresses utilized by tenant resources (i.e., "real" subnet IP address) that overlaps a "real" subnet IP address associated with a cloud component within the cloud platform and/or other tenant resources utilizing the services provided through the cloud platform 100. The address translations include a substitute subnet address corresponding to the real subnet IP address (i.e., "virtual" subnet IP address) for use in the transmission of messages over the cloud platform 100. Each of the gateway data stores $144_1$-$144_M$ and $145_1$-$145_M$ as well as the mapped NATs 152 and 153 are populated by the controller 190.

Referring still to FIG. 1, according to one embodiment of the disclosure, the cloud platform 100 includes a data plane featuring a peering of the set of spoke gateways $144_1$-$144_M$ deployed within the Spoke1 VPC 142 to a set of gateways $175_1$-$175_N$ deployed within the transit VPC 170, which may be referred to as "transit gateways" $175_1$-$175_N$ (N≥2). The set of spoke gateways $145_1$-$145_M$ deployed within the Spoke2 VPC 143 is also communicatively coupled to the transit gateways $175_1$-$175_N$. As ease of illustration, the sets of spoke gateways $144_1$-$144_M$ and $145_1$-$145_M$ are represented as the first spoke gateway $144_1$ and a second spoke gateway $144_2$ along with third spoke gateway $145_1$ and a fourth spoke gateway $145_2$, although three or more spoke gateways may be deployed within the Spoke1 VPC 142 and/or the Spoke2 VPC 143. Similarly, the set of transit gateways $175_1$-$175_N$ is represented by a first transit gateway $175_1$ and a second transit gateway $175_2$, although three or more transit gateways may be deployed within the transit VPC 170.

In general terms, the data plane of the cloud platform 100 features the Spoke1 VPC 142 including "M" spoke gateways and the neighboring transit VPC 170 including "N" transit gateways, where M×N IPSec tunnels $177_{11}$-$177_{MN}$ are created between the Spoke1 VPC 142 and the transit VPC 170. The IPSec tunnels $177_{11}$-$177_{MN}$ may be established and maintained through gateway routing tables $146_1$-$146_M$ dedicated to each of the spoke gateways $144_1$-$144_M$, respectively.

As an illustrative example, as shown specifically in FIG. 1, the first spoke gateway $144_1$ is communicatively coupled to both the first transit gateway $175_1$ via a peer-to-peer communication link $177_{11}$ and the second transit gateway $175_2$ via a peer-to-peer communication link $177_{12}$. Similarly, the second spoke gateway $144_2$ is communicatively coupled to both the first transit gateway $175_1$ via peer-to-peer communication link $177_{21}$ and the second transit gateway $175_2$ via peer-to-peer communication link $177_{22}$. The peer-to-peer communication links $177_{11}$-$177_{22}$ may constitute cryptographically secure tunnels, such as tunnels operating in accordance with a secure network protocol. One example of a secure network protocol may include, but is not limited or restricted to Internet Protocol Security (IPSec). Hence, the VPC-to-VPC tunnels may be referred to as "IPSec tunnels." Hence, as shown, a first gateway routing table $146_1$ determines which IPSec tunnel $177_{11}$-$177_{12}$ for use in forwarding a message from the T1 resources 130 (sometimes referred to as a tenant environment) to the shared services VPC 180 and which IPSec tunnel $177_{11}$-$177_{12}$ to propagate information back to the T1 resources 130. The network traffic filtering system 150, operating in concert with the mapped NATs 152/153, determines whether the incoming control plane messages into the spoke VPCs 140 feature any known overlapping IP addresses prior to transmission therefrom.

III. Network Traffic Filtering System

Figure 2A:
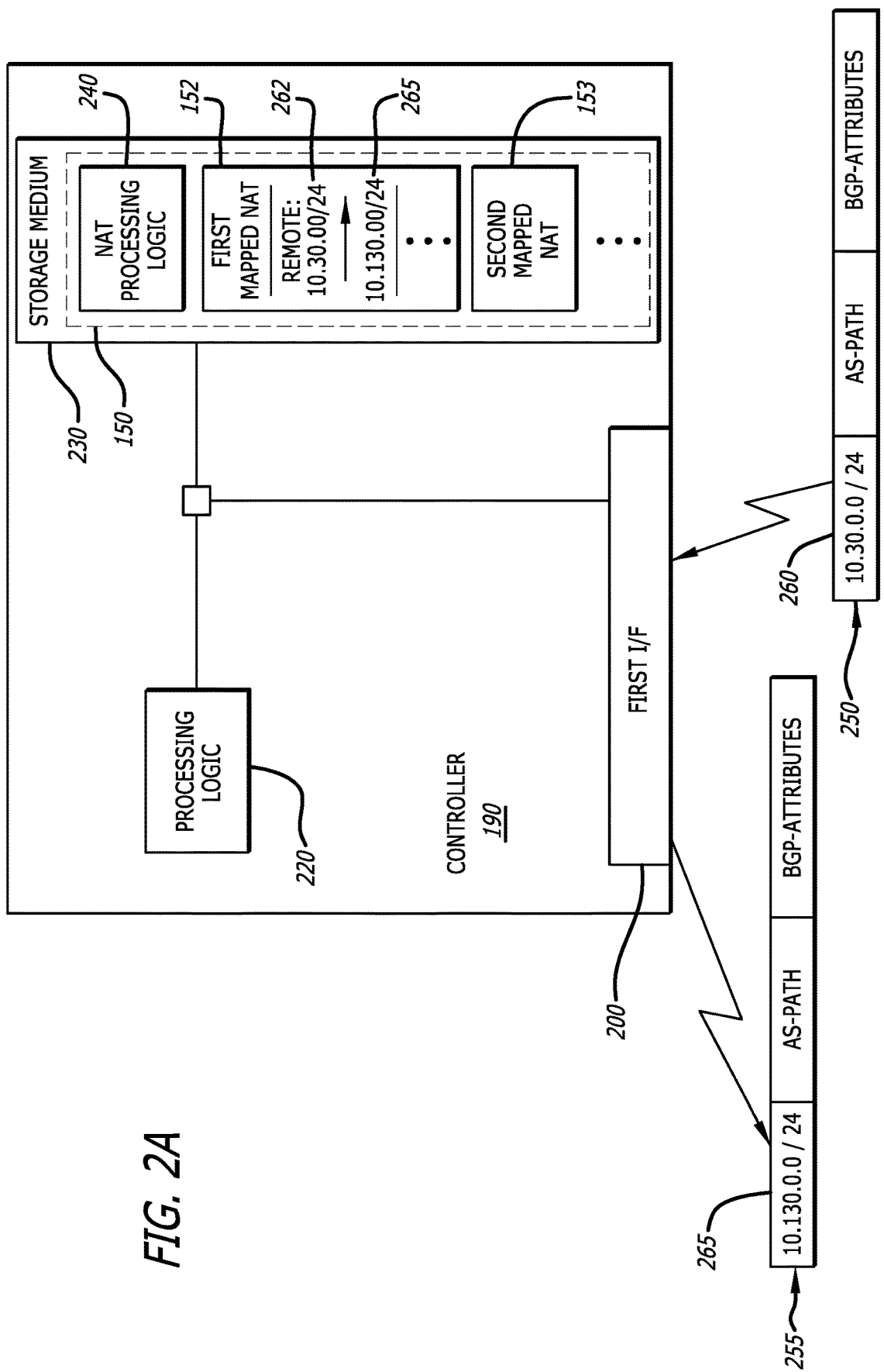
FIG. 2A is an exemplary embodiment of a logical architecture of the network traffic filtering system of FIG. 1 handling ingress network traffic as advertisements from tenant resources.

Referring now to FIG. 2A, an exemplary embodiment of a logical architecture of the network traffic filtering system 150 implemented within one or more cloud components, such as controller 190 deployed within the cloud platform 100 of FIG. 1 for example, is shown. Herein, the controller 190 features one or more input/output (I/O) interfaces 200, one or more processors 220 and a non-transitory storage medium 230. The non-transitory storage medium 230 features the network traffic filtering system 150, which includes the first mapped NAT 152 (utilized by Spoke1 VPC 142 of FIG. 1), the second mapped NAT (utilized by Spoke2 VPC 143 of FIG. 1), and NAT processing logic 240.

The first mapped NAT 152 is configured by the controller 190 with address translations that (i) identify a real subnet IP address that overlaps a subnet IP address associated with a cloud component within the cloud platform and (ii) provide a corresponding "virtual" subnet IP address for use, in lieu of the real subnet IP address, in the transmission of messages over the cloud platform 100. Given that overlapping subnet IP addresses may pertain to different sources, the first mapped NAT 152 may include a first collection of address translations each associated with an overlapping subnet IP address pertaining to a source outside of the cloud platform (referred to as "remote subnet IP address") and a second collection of address translations each associated with a subnet IP address pertaining to a component of the cloud platform (referred to as a "local subnet IP address"). The first mapped NAT 152 is repeatedly updated by the controller 190, notably when new cloud components are added to the cloud platform 100 of FIG. 1 and/or existing cloud components 105 of the cloud platform 100 are removed or modified.

Figure 2B:
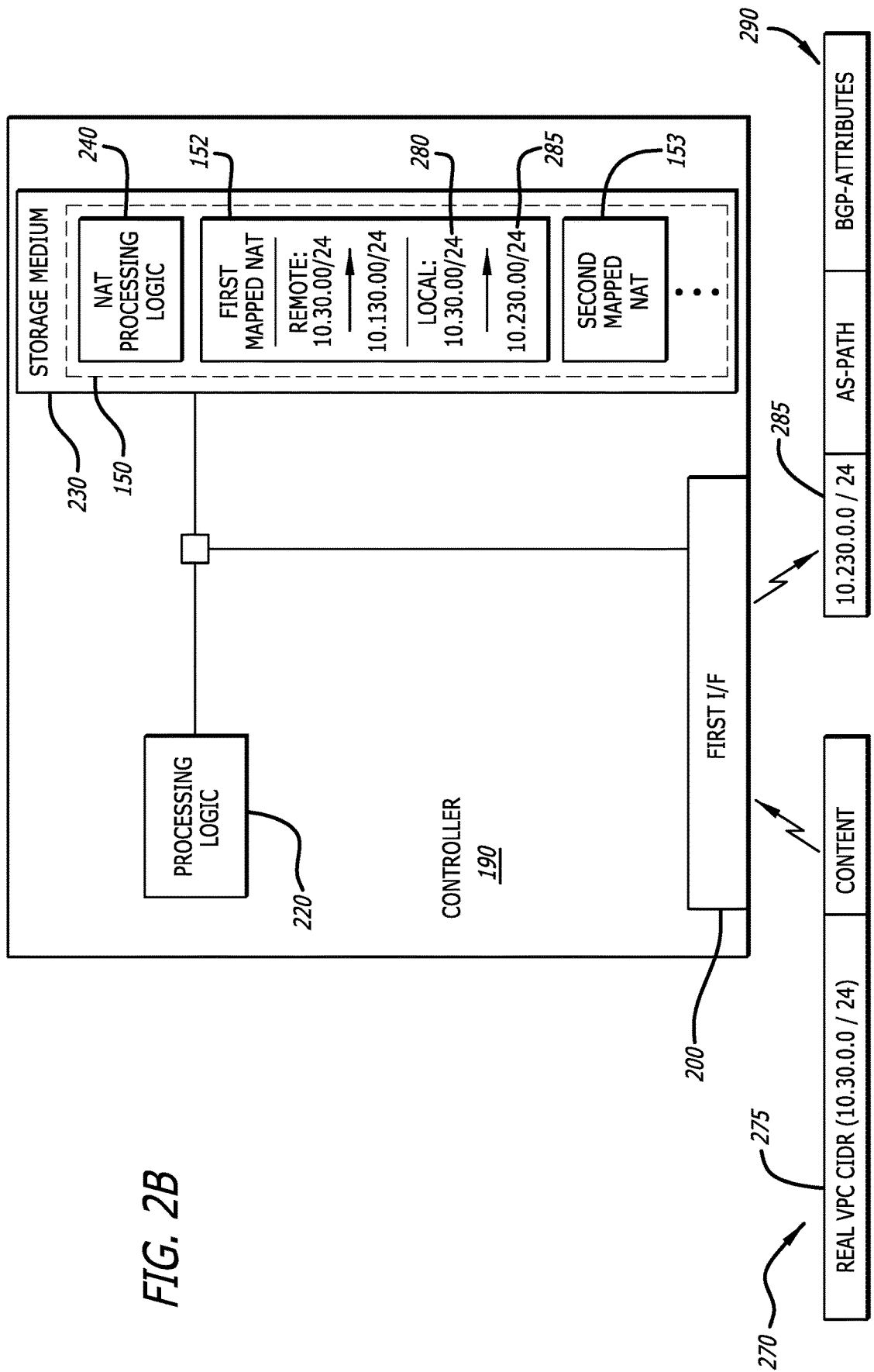
FIG. 2B is an exemplary embodiment of a logical architecture of the network traffic filtering system of FIG. 1 handling egress network traffic as advertisements from cloud components.

The NAT processing logic 240 is configured to detect the receipt of an incoming control plane message 250 via the first I/O interface 200 from tenant resources 130/134 of FIG. 1 and a VPC attachment message 270 from a VPC that has been newly communicatively coupled to the cloud platform 100 (e.g., shared services VPC 180) as shown in FIGS. 1&2B. As described herein and shown in FIG. 2A, the incoming control plane message 250 may constitute, but is not limited or restricted to a BGP advertisement, which is described below for illustrative purposes.

Upon detecting the BGP advertisement 250, a network address included within this control plane message, such as a CIDR-representation of a "real" subnet IP address 260 associated with the source of the BGP advertisement 250 for example, is compared to remote subnet IP addresses within the first mapped NAT 152. For example, where the BGP advertisement 250 is received from a tenant resource (e.g., T1 resources 130) via the first I/O interface 200, the NAT processing logic 240 accesses the real subnet IP address 260 from the BGP advertisement 250. The NAT processing logic 240 determines whether the accessed subnet IP address (real subnet IP address) 260 overlaps a remote subnet IP address 262 being part of an address translation within the first mapped NAT 152 to denote a network address overlapping condition.

If so, the NAT processing logic 240 accesses a translated IP address 265 corresponding to the remote subnet IP address 262 (referred to as the "virtual" subnet IP address 265) from the first mapped NAT 152 and transmits a message directed to the gateway(s) included in Spoke1 VPC 142 from which the real subnet IP address 260 was accessed to update gateway data stores $146_1$-$146_2$ with at least the virtual subnet IP address 265 (and perhaps AS-Path and/or BGP attributes). If no remote subnet IP addresses within the first mapped NAT 152 overlap the real subnet IP address 260, the real subnet IP address 260 remains relied upon for forwarding subsequent data message from tenant resources via the transit VPC 170 of FIG. 1 to the shared services VPC 180 for example.

Alternatively, as shown in FIG. 2B, where the VPC attachment message 270 is received from the shared services VPC 180 (e.g., from shared resources) via the first I/O interface 200, the NAT processing logic 240 accesses a subnet IP address 275 (e.g., CIDR representative of a real subnet IP address referred to as the "real VPC CIDR") from the message 270. Thereafter, the NAT processing logic 240 determines whether the real VPC CIDR 275 overlaps a local subnet IP address 280 being part of an address translation within the first mapped NAT 152 to denote a network address overlapping condition. If so, the NAT processing logic 240 accesses a translated network address (e.g., virtual subnet IP address 285 such as a "virtual VPC CIDR") correspond to the correlated local subnet IP address 280, generates a message to substitute the virtual VPC CIDR 285 for the real VPC CIDR 275 to fulfil a routing change within gateway data stores (e.g. data stores $146_1$-$146_2$, $176_1$-$176_2$, $186_1$-$186_2$), generates a message to prompt recipient gateway(s) to generate a BGP advertisement 290 that advertises availability of functionality offered by the shared services VPC 180 accessible via the virtual VPC CIDR 275 to those tenant resources communicatively coupled to the cloud platform via BGP tenant connections (see FIG. 1). Although not shown, for those mapped NATs in which the real VPC CIDR 275 fails to correspond to any of the subnet IP addresses within a particular mapped NAT (e.g., the first mapped NAT 152 associated with the first BGP tenant connection), the real VPC CIDR 275 of the message 270 would be included as part of the BGP advertisement 290 and no routing changes are made to the gateway data stores $146_1$-$146_2$, $176_1$-$176_2$ and $186_1$-$186_2$.

Figure 3:
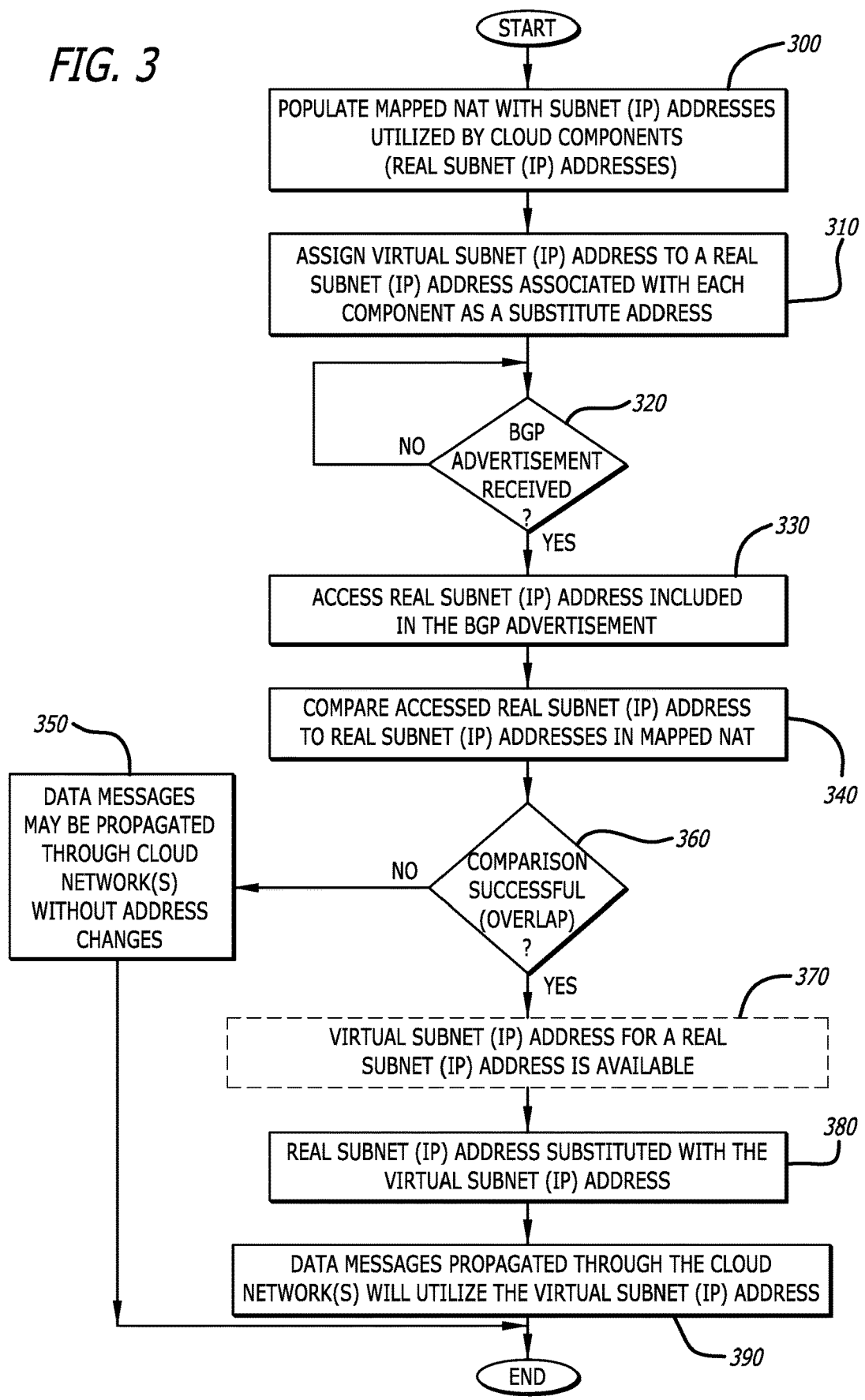
FIG. 3 is an exemplary embodiment of the operability of the network traffic filtering system within the spoke gateways of FIG. 1.

Referring now to FIG. 3, an exemplary embodiment of the operability of the network traffic filtering system 150 within the controller 190 of FIG. 1 performing analytics directed to detecting network traffic with overlapping network addresses is shown. Herein, the mapped NAT is populated with subnet (IP) addresses utilized by cloud components within the cloud platform and/or subnet addresses utilized by tenant resources that overlap, which are referred to as "real subnet (IP) addresses" (operation 300). For each subnet (IP) address for a cloud component, a corresponding "virtual" subnet (IP) address is generated, which is referred to as "virtual subnet (IP) address" (operation 310).

Upon detecting an incoming control plane message, such as a BGP advertisement received by the spoke gateway $144_1$ of FIG. 1 for example, a "real" subnet (IP) address included in the BGP advertisement (e.g., CIDR-representation for a subnet IP address of the source initiating the BGP advertisement) is accessed and compared with the real subnet (IP) addresses maintained within the mapped NAT to determine if a network address overlapping condition exists (operations 320, 330, 340 and 350). This comparison may be performed by the network traffic filtering system 150 deployed within the controller 190 of FIG. 1. The network traffic filtering system 150 may be deployed as a software instance of a cloud platform that is executed by a processor. As an alternative embodiment, the comparison may be conducted by the network traffic filtering system 150 based on the mapped NAT populated by automated through trained, machine learning logic or other artificial intelligence-based logic that compares CIDR-representations of "real" subnet (IP) addresses gathered from analysis of cloud components and tenant resources registered to use the cloud platform.

If the accessed "real" subnet (IP) address is not currently present within the mapped NAT, data messages transmitted over the data plane subsequent to receipt of the incoming control plane message are routed over the cloud platform without alternation (e.g., using the accessed real subnet (IP) address for routing. The mapped NAT is repeatedly updated based on changes in the cloud components and/or subnet addresses for these components. However, when the mapped NAT includes a real subnet (IP) address that overlaps the accessed real subnet (IP) address (e.g., IP address range associated with the accessed real subnet (IP) address is identical to or at least partially contained within an IP address range associated with a real subnet (IP) address within the mapped NAT), a virtual subnet (IP) address corresponding to the real subnet address is made available (operations 360 and 370).

Once a network address overlapping condition has been detected, the real subnet (IP) address is substituted with the corresponding virtual subnet (IP) address identified in a corresponding entry of the mapped NAT (operation 380). Thereafter, gateway routing data stores are altered to substitute the virtual subnet address for the real subnet IP address so that data messages propagated over the data plane subsequent to receipt of the incoming control plane message (and before any further changes) are routed over the cloud platform by using the virtual subnet IP address identifying the source or destination of the data messages (operation 390).

IV. Automated Detection of Overlapping Network Addresses

Referring to FIG. 4, a first exemplary embodiment of the operability of network traffic filtering system 150 deployed within the controller 190 and operating in concert with cloud components of the cloud platform 100, such as the spoke gateways $144_1$ for example, is shown. Herein, the network traffic filtering system 150 is configured to restrict continued propagation of network traffic associated with overlapping network address.

More specifically, according to this illustrative embodiment including the cloud platform architecture of FIG. 1, a first computing device 400 may be allocated a real network (IP) address 402 (10.30.0.19) within a first subnet 404 (CIDR-representation 10.30.0.0/24) reserved for the T1 resources 130. Similarly, a second computing device 410 also may be allocated a real network (IP) address 412 (10.30.0.5) within a second subnet 414 (CIDR-representation 10.30.0.0/24), which features a subnet address range identical to the first subset 404. A third computing device 420 may be allocated a real network (IP) address 422 (10.40.0.19) within a third subnet 424 (CIDR-representation 10.40.0.0/24), which is outside the private address range used by the first subnet 404 and the second subnet 414.

Additionally, as shown in FIG. 4, resources associated with the Spoke1 VPC 142 may be allocated IP addresses within a fourth subnet 430 (CIDR-representation 10.7.0.0/24) while resources associated with the Spoke2 VPC 143 may be allocated IP addresses within a fifth subnet 440 (CIDR-representation 10.7.1.0/24), both of which do not overlap with each other or any of the subnet address ranges utilized to the T1 resources 130, the T2 resources 132, or the T3 resources 134. Similarly, resources associated with the transit VPC 170 may be allocated with IP addresses within a sixth subnet 450 (CIDR-representation 10.0.0.0/24), which does not overlap any of the subnet address ranges utilized by T1 resources 130, T2 resources 132, T3 resources 134, the Spoke1 VPC 142, and the Spoke2 VPC 143. However, for this illustrative embodiment, the resources within the shared services VPC 180 are allocated IP addresses within a seventh subnet 460 (CIDR-representation 10.30.0.0/24), where the first subnet 404, the second subnet 414, and the seventh subnet 460 addresses constitute overlapping network addresses.

According to one embodiment of the disclosure, after a first BGP tenant connection has been established between the router 136 and the spoke gateway 144₁, in response to the first computing device 400 of the T1 resources 130 sending the control plane message 160 (e.g., a BGP advertisement to advertise the first subnet 404) to the Spoke1 VPC 142, the NAT processing logic 240 may be configured to detect the incoming BGP advertisement 160 and access a real subnet IP address 406 correspond to the first subnet 404 (CIDR-representation 10.30.0.0/24) from the IP address field 162 of the BGP advertisement 160. For this illustrative embodiment, the first subnet address 406 may include the CIDR-representation, namely the IPv4 address "10.30.0.0" along with a corresponding subnet mask (or subnet prefix length). Where the subnet mask (or subnet prefix length) is 24-bits (e.g., three octets or/24), the most significant 24-bits of the private (IP) address associated with the first computing device 400 generally represent the first IP subnet address 406.

After accessing the first subnet IP address 406, the NAT processing logic 240 determines whether an overlapping network (IP) address condition exists. As the first mapped NAT 152 associated with the first BGP tenant connection includes a "local" subnet address 460 (i.e., local to the cloud platform 100 with CIDR-representation 10.30.0.0/24) constituting the subnet IP address range utilized by the shared services VPC 180, which includes a software instance 462 allocated a real subnet IP address 464 (CIDR-representation 10.30.0.17), the BGP advertisement 160 is dropped and thereby the content of data messages from the T1 resources 130 are prohibited from propagating through the cloud platform 100.

In contrast, in response to the third computing device 420 of the T3 resources 134 sending a BGP advertisement 470 to the Spoke1 VPC 142 via a second BGP tenant connection, the NAT processing logic 240 associated with a spoke gateway 144₂, in communication with the router 137 of the T3 resources 134, accesses an address 426 of the third subnet 424 (CIDR-representation 10.40.0.0/24) from an IP address field 472 of the BGP advertisement 470. After accessing the third subnet IP address 426, the NAT processing logic 240 determines whether an overlapping network (IP) address condition exists. As no mapped NAT is associated with the second BGP connection identifies a "remote" subnet address 10.40.0.0/24 (i.e., remote from cloud platform 100) as overlapping an IP address utilized by any cloud components within the cloud platform 100 or even any other tenant resources 130 or 132, data messages from the T3 resources 134 are permitted to be forwarded by the spoke gateway 144₁ to the transit VPC 170 and propagated through the cloud platform 100.

Referring now to FIGS. 5A-5D, a second exemplary embodiment of the operability of the network traffic filtering system 150 deployed within cloud components of the cloud platform 100 is shown. Herein, as further shown in FIG. 5A, the NAT processing logic 240 of the network traffic filtering system 150 is configured to alter gateway data stores in response to receiving an incoming (control plane) message with overlapping network addresses prior to subsequent propagation of data messages over the cloud platform 100.

As described above, according to this illustrative embodiment including the cloud platform architecture of FIG. 1, the first computing device 400 may be allocated the real network (IP) address 402 (10.30.0.19) within the first subnet 404 (CIDR-representation 10.30.0.0/24) reserved for the T1 resources 130. Similarly, the second computing device 410 also may be allocated the real network (IP) address 412 (10.30.0.5) within the second subnet 414 (CIDR-representation 10.30.0.0/24). The third computing device 420 may be allocated the real network (IP) address 422 (e.g., CIDR-representation 10.40.0.19) within the third subnet 424 (CIDR-representation 10.40.0.0/24).

Figure 5A:
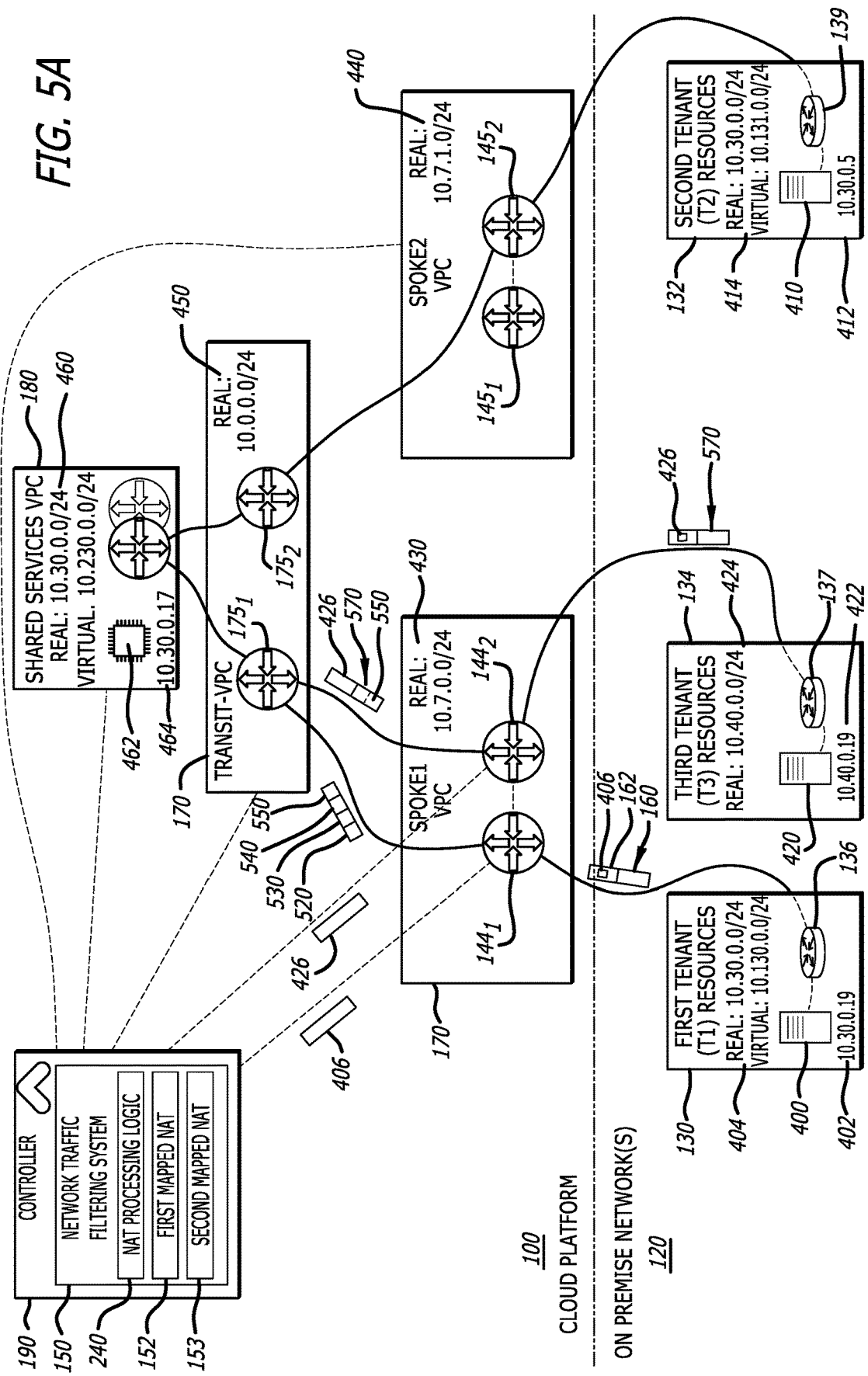
FIGS. 5A-5D are directed to a second exemplary embodiment of the operability of the network traffic filtering system deployed within cloud components of the cloud platform to alter the network address of incoming control plane messages with overlapping network addresses prior to their continued propagation over the cloud platform.

Additionally, as shown in FIG. 5A, resources associated with the Spoke1 VPC 142 may be allocated IP addresses within the fourth subnet 430 (CIDR-representation 10.7.0.0/24) while resources associated with the Spoke2 VPC 143 may be allocated IP addresses within the fifth subnet 440 (CIDR-representation 10.7.1.0/24). Similarly, resources associated with the transit VPC 170 may be allocated with IP addresses within the sixth subnet 450 (CIDR-representation 10.0.0.0/24) and the resources within the shared services VPC 180 are allocated IP addresses within the seventh subnet 460 (CIDR-representation 10.30.0.0/24). For this illustrative embodiment, the third, fourth, fifth and sixth subnets 424, 430, 440 and 450 feature non-overlapping IP address ranges. However, the first subnet 404 associated with the T1 resources 130, the second subnet 414 associated with the T2 resources 132, and the seventh subnet 460 associated with the shared services VPC 180 (CIDR-representation 10.30.0.0/24) feature overlapping IP addresses associated with cloud components forming the cloud platform 100.

For this embodiment, after a first BGP tenant connection has been established between the spoke gateway 144₁ and the router 136 of the T1 resources 130 and after receipt of the BGP advertisement 160 advertising the first subnet 404 of the first computing device 400 of the T1 resources 130, the NAT processing logic 240 may be configured to determine whether an overlapping network (IP) address condition exists. For example, this determination may be accomplished from conducting analytics on the first subnet IP address 406 (CIDR-representation 10.30.0.0/24) included in the IP address field 162 of the BGP advertisement 160. According to one embodiment of the disclosure, the NAT processing logic 240 may receive the first subnet IP address 406 or as part of the contents of the BGP advertisement 160 made available to the controller 190. Thereafter, the NAT processing logic 240 is configured to conduct analytics by determining whether the first subnet IP address 406 coincides with a CIDR-representation of the first subnet IP address (CIDR-representation 10.30.0.0/24) within the first mapped NAT 152. The first mapped NAT 152 features the network address translations for the first BGP tenant connection with the T1 resources 130. The presence of a coinciding network address translation identifies to the NAT processing logic 240 that a network address translation of the first subnet IP address 406 is required.

Figure 5B:
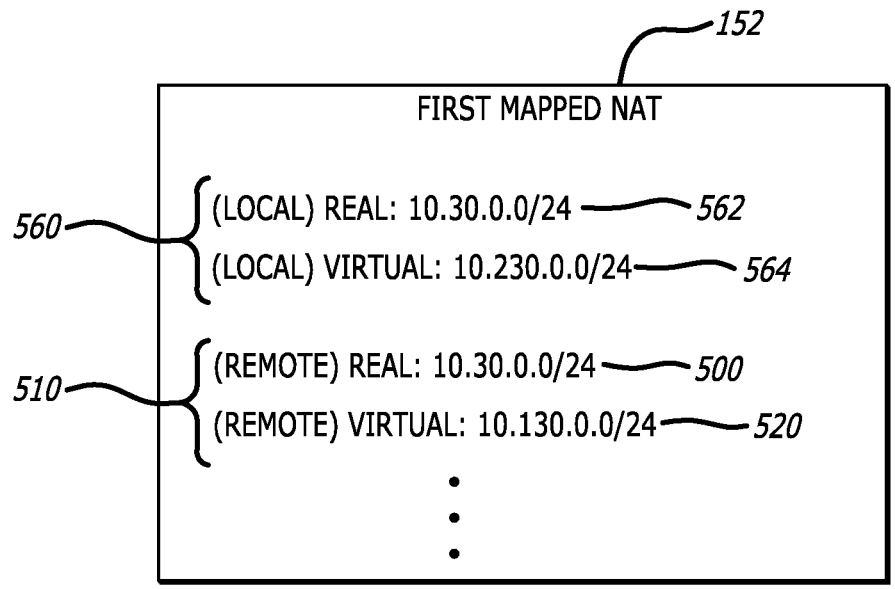

Stated differently, shown in FIG. 5B, a presence of a network address overlapping condition may be determined by identifying whether the first subnet address 406 is included in the first mapped NAT 152. For example, the first mapped NAT 152 may include a "remote" network address translation 510 directed to the first subnet 404 of the first tenant resources 130, where the network address translation 510 includes the overlapping subnet IP address representation 500 (i.e., remote network address (real)=10.30.0.0/24) along with a counterpart network address translation 520 (i.e., remote network address (virtual)=10.130.0.0/24). This network address translation 520 is conducted to program all gateways with a route 10.130.0.0/24 to point towards the set of spoke gateways 144 so resources in the cloud network can access the T1 resources 130 by using its virtual subnet.

As a result, subsequent to the BGP advertisement 160, one or more data messages may be routed by the spoke gateway 144₁ to include the virtual (remote) network address 520 as the identifier for the T1 resource 130 in lieu of the real (remote) network address 500 along with AS path data 530 and/or other content (e.g., next hop addressing/information, etc.) 540. Furthermore, the subnet address 550 (CIDR-representation 10.7.0.0/24), which is not part of the first mapped NAT 152, may be included as part of a routing path maintained by messaging between the Spoke1 VPC 142 and the transit VPC 170.

As further shown in FIG. 5B, the first mapped NAT 152 may also include "local" network address translations associated with cloud components with subnet IP addresses that overlap subnet IP addresses associated with one or more tenant resources. For example, the first mapped NAT 152 may further include a network address translation 560, namely an IP address translation for the real subnet IP address (real VPC CIDR) 562 associated with the seventh subnet 460 (i.e., local network address (real)=10.30.0.0/24) that overlaps the first subnet IP address 406, along with its counterpart virtual subnet IP address 564 (i.e., local network address (virtual)=10.230.0.0/24). This network address translation 560 may be also directed to BGP advertisements initiated from the first spoke gateway 144₁ of the cloud platform 100 to T1 resources 130 based on messaging from the controller 190 prompted by a cloud component (e.g., shared services VPC 180).

Figure 5C:
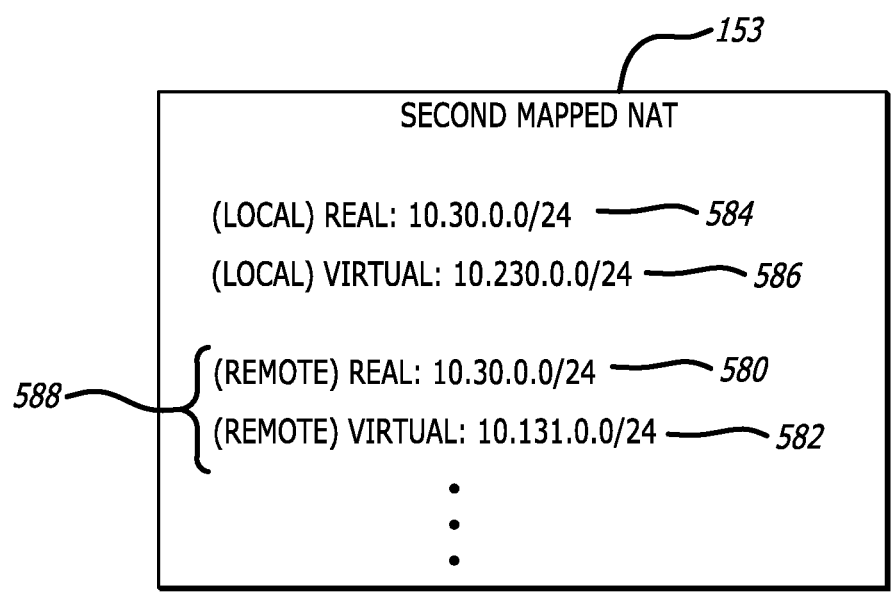

Referring to FIG. 5C, a second mapped NAT 153 associated with a BGP tenant connection between spoke gateway 145₂ and T2 resources 132 may include one or more "real" network address translations associated with control plane messages (e.g., BGP advertisement). The network address translations may be conducted on content received from the tenant resources 132 prior to continuing propagation through the cloud platform 100 of FIG. 5A. For example, the second mapped NAT 153 includes a network address translation from real subnet IP address (CIDR-representation 10.30.0.0/24) 580 to virtual subnet IP address (CIDR-representation 10.131.0.0/24) 582.

Additionally, the second mapped NAT 153 may include one or more network address translations between a real VPC CIDR 10.30.0.0/24 584 for the shared services VPC 180 and a virtual subnet IP address 586 (e.g., CIDR-representation 10.230.0.0/24), given that a network address overlapping condition exists between the subset address range used by the shared services VPC 180 and the subnet address range used by the T2 resources 132. The second mapped NAT 153 may be updated with this translation during an attachment phase of the shared services VPC 180 for example.

These network address translations are not necessary for the third tenant resources 134 utilizing the Spoke1 VPC 142 for communications with the shared services VPC 180. In contrast, as shown in FIG. 5A and after the Spoke1 VPC 142 receives a BGP advertisement 570 from the computing device 420 of the tenant resources 134 via router 137, the NAT processing logic 240 is provided access to the third subnet (IP) address 426 associated with the computing device 420 (e.g., CIDR subnet address 10.40.0.0/24) to determine whether the third subnet address 426 constitutes an overlapping IP address. As there are no mapped NATs for the BGP tenant connection with the spoke gateway 144₂ that identifies the subnet CIDR 10.40.0.0/24 as pertaining to an overlapping condition, one or more data messages subsequent to the BGP advertisement 570 may be routed by the spoke gateway 144₂ to o the transit VPC 170 and propagated through the cloud platform 100. The data message(s) may include the real (third) subnet IP address 426 as the identifier for the T3 resource 134 along with the subnet address 550 (CIDR-representation 10.7.0.0/24 included as part of a routing path) and/or other content (e.g., next hop addressing/information, etc.) 570.

Figure 5D:
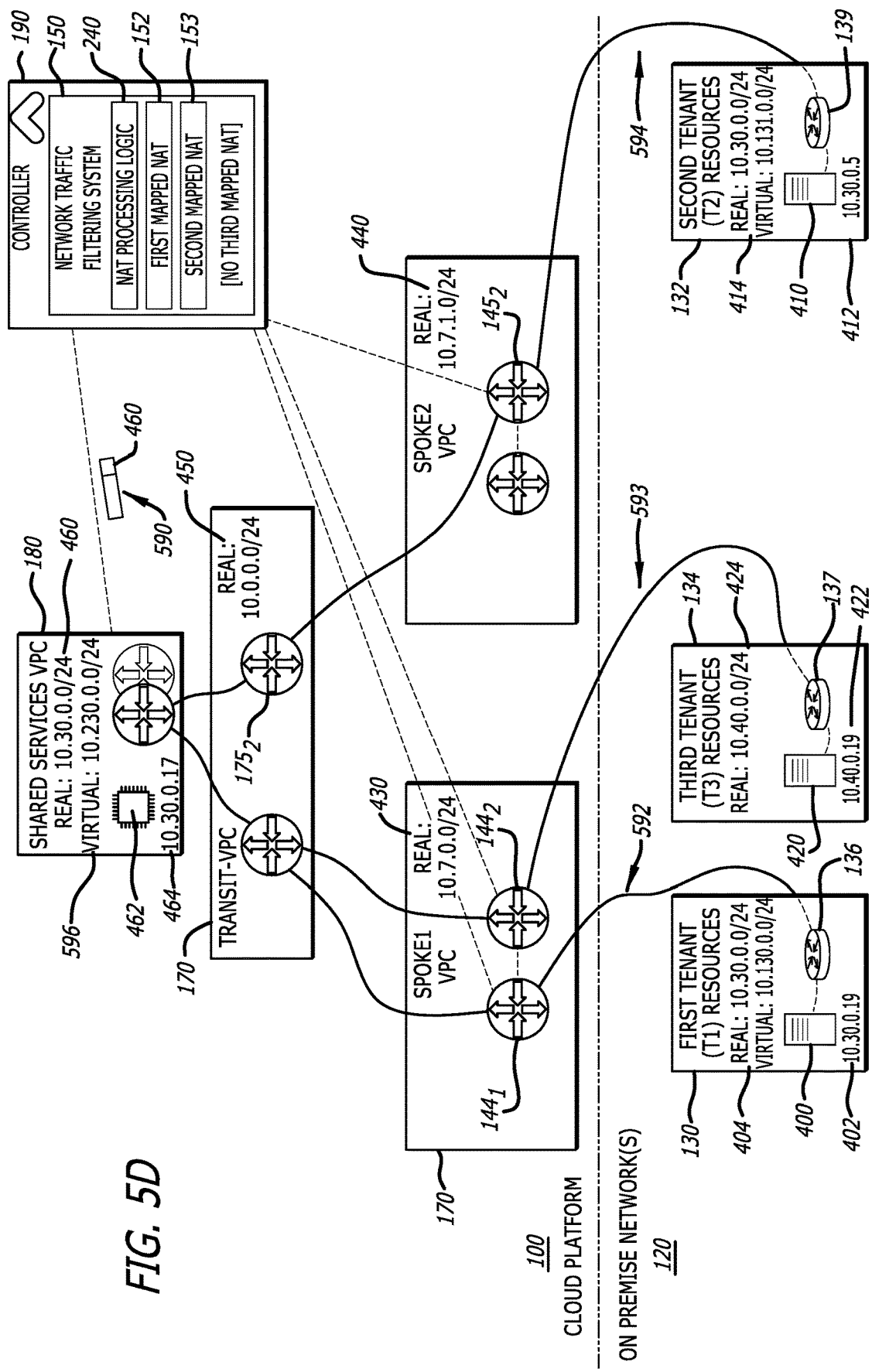

Additionally, as shown in FIGS. 5B-5D, in response to communicatively coupling (i.e., attaching) a VPC to the cloud platform 100 (e.g., attaching the shared services VPC 180 to transit gateway 175₂ of the transit VPC 170), the NAT processing logic 240 is configured to determine, using the "real" subnet address 460 for the shared services VPC 180, whether a network address overlapping condition exists. According to one embodiment of the disclosure, the NAT processing logic 240 detects a network address overlapping condition when a subnet IP address with the IP address range associated with the real subnet address 460 is found in a mapped NAT associated with any of the existing BGP tenant connections 592-594.

For example, the first mapped NAT 152 is associated with network address translations handled over the first BGP tenant connection 592. Likewise, the second mapped NAT 153 is associated with a third BGP tenant connection 594. No (or an empty) mapped NAT is associated with the second BGP tenant connection 593. The real subnet address 460 is provided by a VPC attachment message 590 (represented as signaling 270 in FIG. 2A), such as a CIDR-representation 10.30.0.0/24 for example.

As an illustrative example, upon receiving the VPC attachment message 590, the NAT processing logic 240 is configured to determine whether a network address overlapping condition exists for communications with the T1-T3 resources 130/132/134 over BGP tenant connections 592/593/594. For the T1 resources 130 over the first BGP tenant connection 592 between spoke gateway 144₁ and T1 resources 130, the NAT processing logic 240 would access the first mapped NAT 152 and detect a network address overlapping condition based on the real-virtual network address translation 560 as shown in FIG. 5B. Additionally, for the T2 resources 132 over the third BGP tenant connection 594 between spoke gateway 145₂ and T2 resources 132, the NAT processing logic 240 would access the second mapped NAT 153 and detect a network address overlapping condition based on a real-virtual network address translation 588 as shown in FIG. 5C.

Therefore, for BGP advertisements over the first BGP tenant connection 592 to the T1 resources 130 and over the third BGP tenant connection 594 to the T2 resources 132, the NAT processing logic 240 assists in performing the translation by at least signaling the corresponding spoke gateways 144₁ and 145₂, operating as terminating ends of the BGP tenant connections 592 and 594, to transmit a BGP advertisement to the T1 and T2 resources 130/132 for the newly attached shared services VPC 180 using the virtual subnet IP address 586 (CIDR-representation 10.230.0.0/24) in lieu of the real subnet address 584 (CIDR-representation 10.30.0.0/24). For the second BGP tenant connection 593 without any network address overlapping conditions, the NAT processing logic 240 signals the spoke gateway 144₂, operating as a terminating end of the second BGP tenant connection 593, to transmit a BGP advertisement to the T3 resources 134 using the real subnet address 584 (CIDR-representation 10.30.0.0/24) of the shared services VPC 180.

Figure 6:
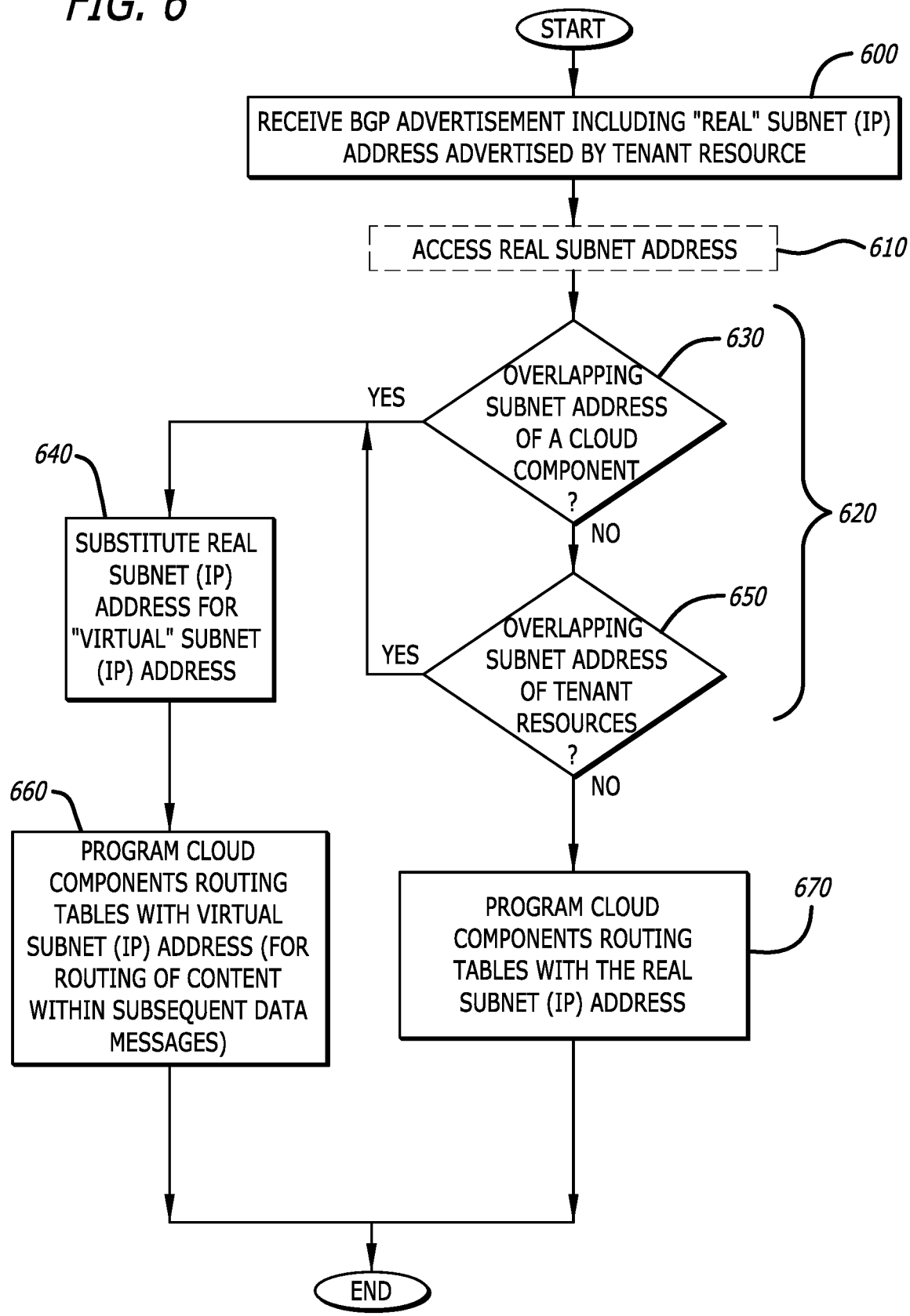
FIG. 6 is an exemplary embodiment of the method of operations associated with the transmission of a Border Gateway Protocol (BGP) advertisement from the first tenant resource of FIG. 1.

Referring to FIG. 6, an exemplary embodiment of the method of operations associated with the transmission of a message (e.g., BGP advertisement) from the first tenant resources 130 is shown. Herein, the BGP advertisement may include a "real" subnet (IP) address associated with and advertising tenant resources. The BGP advertisement is received by a spoke gateway assigned for providing the tenant resources with access to the cloud platform, including services within the shared services VPC (operation 600). Thereafter, the NAT processing logic may be configured to access the real subnet (IP) address being advertised (CIDR) and conduct analytics to determine whether an overlapping IP address condition exists involving the subnet (IP) address (operations 610, 620).

For example, the NAT processing logic conducts analytics to determine whether an overlapping IP address condition exists between the subnet (IP) address of the source and subnet addresses associated with cloud components within the cloud platform (operation 630). Such analytics may be conducted by accessing a pre-populated mapped NAT to determine if the subnet (IP) address identified in the BGP advertisement is included as part of a network address translation within the mapped NAT. If so, the NAT processing logic conducts the network address translation by substituting the "real" subnet (IP) address (e.g., real VPC CIDR) corresponding to routing addresses within gateway data stores associated with gateways within the cloud platform with the "virtual" subnet (IP) address (virtual VPC CIDR) as set forth in operation 640.

If not, the NAT processing logic conducts analytics to determine whether an overlapping IP address condition exists between the "real" subnet (IP) address associated with the BGP advertisement and subnet addresses associated with any tenant resources utilizing the cloud platform (operation 650). If so, the NAT processing logic conducts the network address translation by substituting the "real" subnet (IP) address with the "virtual" subnet (IP) address (operation 640). The determination as to which gateway data stores may be universal to all of the gateway data stores associated with gateways within the cloud platform or only specific gateway data stores within a routing associated with the source of the real subnet (IP) address. As a result, the content of incoming data messages subsequent to the BGP advertisement will utilize the virtual subnet address in lieu of the "real" subnet address when propagated through cloud components within the cloud platform (operation 660).

Otherwise, where there is no network address translation to be conducted as the "real" subnet address associated with the BGP advertisement does not overlay any subnets associated with the cloud components and tenant resources, the program (or maintain) the gateway data stores (cloud component data stores) with the "real" subnet address (operation 670).

Figure 7:
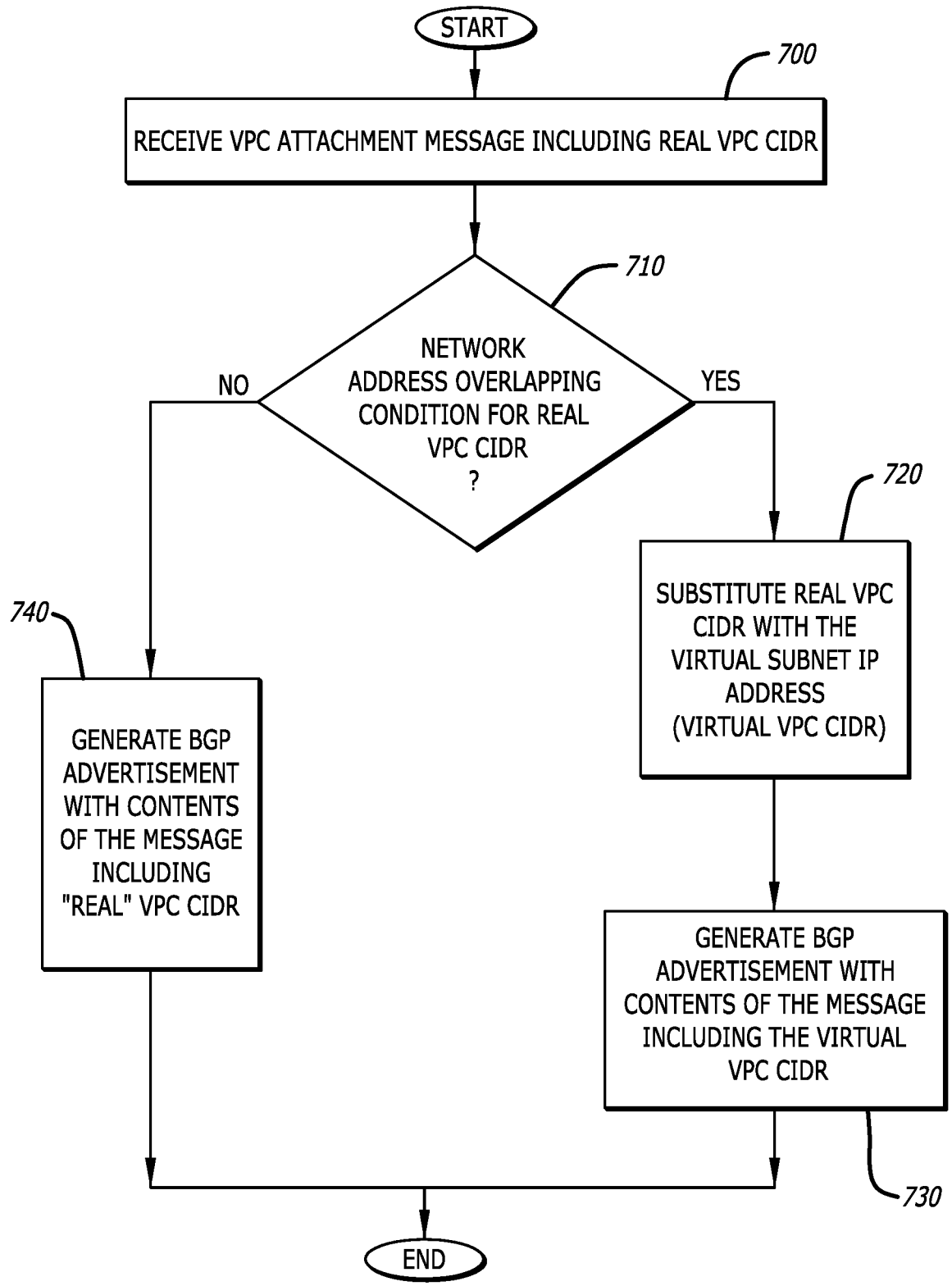
FIG. 7 is an exemplary embodiment of the method of operations associated with a response to the BGP advertisement of FIG. 6.

Referring now to FIG. 7, an exemplary embodiment of the method of operations associated with the transmission of a message (e.g., the VPC attachment message) from the shared services VPC 180 is shown. Herein, the message would include at least the real VPC CIDR, namely the "real" subnet IP address assigned to the shared services VPC (operation 700). The NAT processing logic within the controller conducts analytics to determine whether an overlapping IP address condition exist for the real VPC CIDR (operation 710). Herein, the analytics conducted on the message are directed to determining whether the real VPC CIDR is present within any of the mapped NATs. If so, the NAT processing logic conducts the network address translation by substituting the "real VPC CIDR (CIDR-representation 10.30.0.0/24) for the "virtual" subnet IP address (e.g., virtual VPC CIDR 10.230.0.0/24) as set forth in operation 720. Thereafter, a BGP advertisement to the tenant resources is generated to include the contents of the messaging, including the virtual VPC CIDR (operation 730) Otherwise, if no network address overlapping condition, a BGP advertisement to the tenant is generated to include the contents of the messaging, including the real VPC CIDR (operation 740).

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A cloud platform overlaying infrastructure of one or more public cloud networks, the cloud platform comprising:
   a controller implemented as logic stored on a non-transitory, computer-readable medium, the controller comprising:
   a virtual processor; and
   a data store communicatively coupled to the virtual processor, the data store includes a network traffic filtering system logic configured to:
   (i) determine whether a first control plane message is associated with a first network address overlapping condition, the first network address overlapping condition is detected when the first control plane message, received from a first tenant resources, includes a network address that overlaps a subnetwork address relied upon by either (a) a component within the cloud platform or (b) a component associated with a second tenant resources different from the first tenant resources, and
   (ii) prevent data messages associated with the network address from being routed over the cloud platform in response to the network address overlapping condition being detected.

2. The controller of claim 1, wherein the network traffic filtering system logic is further configured to prevent data messages associated with the network address from being routed from a first virtual cloud network by precluding propagation of content, including the network address, from the first virtual cloud network.

3. The controller of claim 1 communicatively coupled to the first tenant resources associated with a first on-premises network and the second tenant resources associated with a second on-premises network different than the first on-premises network.

4. The controller of claim 1, wherein the first control plane message corresponds to a Border Gateway Protocol (BGP) advertisement in which the network address is an advertised network address.

5. The controller of claim 4, wherein the network traffic filtering system logic to prevent the data messages associated with the advertised network address from being routed over the cloud platform by at least altering the advertised network address within each of the data messages.

6. The controller of claim 5, wherein network address translation (NAT) processing logic implemented within the network traffic filtering system logic is configured to determine that the Border Gateway Protocol (BGP) advertisement is associated with a network address overlapping condition by at least determining whether the advertised network address is located within a mapped network address translation (NAT), the mapped NAT comprises address translations for one or more network addresses identified to have overlapping network addresses with a subnetwork address associated with a component of a cloud platform or a component of a previously registered tenant resource.

7. The controller of claim 6, wherein network address translation (NAT) processing logic implemented within the network traffic filtering system logic is further configured to program a data store associated with each of a plurality of components deployed within a first virtual cloud network to route the data messages identifying the first tenant resources supplying the BGP advertisement with a virtual network address in lieu of the advertised network address.

8. The controller of claim 6, wherein network address translation (NAT) processing logic implemented within the network traffic filtering system logic is further configured to program a data store associated with each of a plurality of components deployed within the cloud platform being a software-defined network constructed to overlay at least one public cloud network to substitute a virtual network address in lieu of the advertised network address.

9. The controller of claim 1, wherein the network traffic filtering system logic comprises network address translation (NAT) processing logic, the NAT processing logic is configured to determine whether the first control plane message that advertises the network address is located within a mapped network address translation (NAT), the mapped NAT comprises address translations for one or more network addresses identified to have overlapping network addresses with a subnetwork address associated with a component of a cloud platform or a component of a previously registered tenant resources.

10. A cloud platform overlaying infrastructure of one or more public cloud networks, the cloud platform comprising:
  a controller in communication with components of the cloud platform, the controller implemented as logic stored on a non-transitory, computer-readable medium and comprising:
    a virtual processor; and
    a data store communicatively coupled to the virtual processor, the data store includes network address translation (NAT) processing logic configured to:
      (i) monitor one or more control plane messages,
      (ii) determine whether a first control plane message of the one or more control plane messages is associated with a network address overlapping condition representing a first network address included in the first control plane message overlaps a network address range relied upon by either (a) at least one of the components of the cloud platform or (b) a component associated with a second source with access to the cloud platform, and
      (iii) alter routing data stores that maintain routing information for each of the components of the cloud platform to substitute the first network address with a first virtual network address so that subsequent routing of data messages referencing the first network address are routed through the cloud platform as data messages referencing the first virtual network address.

11. The controller of claim 10, wherein the source constitutes a first tenant resources, the first network address corresponds to a real subnetwork address associated with the first tenant resources, and the first virtual network address corresponds to a virtual subnetwork address assigned to the first tenant resources.

12. The controller of claim 10, wherein the NAT processing logic configured to determine whether the first control plane message of the one or more control plane messages is associated with the network address overlapping condition by at least access a NAT data store associated with the first tenant resources to determine whether the first network address is included as a mapped network address translation within the NAT data store, the mapped network address translation includes the first network address corresponding to the first virtual network address.

13. The controller of claim 10, wherein the first control plane message corresponds to a Border Gateway Protocol (BGP) advertisement in which the first network address is an advertised network address.

14. The controller of claim 13, wherein the NAT processing logic is configured to determine that the BGP advertisement is associated with a network address overlapping condition by at least determining whether the advertised network address is located within a mapped network address translation (NAT), the mapped NAT comprises address translations for one or more network addresses identified to have overlapping network addresses.

15. A cloud platform overlaying infrastructure of one or more public cloud networks, the cloud platform comprising:
  a controller in communication with components of the cloud platform, the controller implemented as logic stored on a non-transitory, computer-readable medium and comprising:
    a virtual processor; and
    a data store communicatively coupled to the virtual processor, the data store includes network address translation (NAT) processing logic configured to:
      (i) determine whether an incoming control plane message is associated with a network address overlapping condition representing a first network address included in the incoming control plane message overlaps a network address range relied upon by either (a) at least one of the components of the cloud platform or (b) a component associated with one or more tenant resources, and
      (ii) alter routing data stores that maintain routing information for each of the components of the cloud platform to substitute the first network address with a first virtual network address so that a data message referencing the first network address are now transmitted through or from the cloud platform as at least a message referencing the first virtual network address.

16. The controller of claim 15, wherein the incoming control plane message corresponds to a virtual private cloud (VPC) attachment message.

17. The controller of claim 16, wherein the VPC attachment message is provided from a first component of the cloud platform.

18. The controller of claim 15, wherein the incoming control plane message is provided from a first tenant resource of the one or more tenant resources.

* * * * *